United States Patent

Madurai-Kumar et al.

(10) Patent No.: US 9,550,429 B2
(45) Date of Patent: Jan. 24, 2017

(54) SYSTEMS AND METHODS FOR MANAGEMENT OF FLEET BATTERIES

(71) Applicant: Cummins, Inc., Columbus, IN (US)

(72) Inventors: Mahesh Madurai-Kumar, Columbus, IN (US); Morgan M. Andreae, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 226 days.

(21) Appl. No.: 14/454,152

(22) Filed: Aug. 7, 2014

(65) Prior Publication Data

US 2016/0039295 A1 Feb. 11, 2016

(51) Int. Cl.
*H02J 7/00* (2006.01)
*B60L 11/18* (2006.01)

(52) U.S. Cl.
CPC ........ *B60L 11/184* (2013.01); *B60L 11/1861* (2013.01); *B60L 11/1862* (2013.01); *Y02T 10/7005* (2013.01); *Y02T 10/7055* (2013.01)

(58) Field of Classification Search
USPC ............... 320/106, 109, 132, 135, 136, 155
See application file for complete search history.

(56) References Cited

U.S. PATENT DOCUMENTS

| | | | |
|---|---|---|---|
| 6,941,197 B1* | 9/2005 | Murakami | B60L 11/1816 320/109 |
| 7,877,198 B2 | 1/2011 | Tenzer et al. | |
| 7,904,217 B2 | 3/2011 | Miller | |
| 8,086,364 B2 | 12/2011 | Xue et al. | |
| 2007/0173993 A1 | 7/2007 | Nielsen et al. | |
| 2009/0027056 A1* | 1/2009 | Huang | B60L 11/1857 324/439 |
| 2009/0112495 A1* | 4/2009 | Center | G01R 31/3679 702/63 |
| 2010/0121587 A1 | 5/2010 | Vian et al. | |
| 2011/0270486 A1* | 11/2011 | Stevens | G06Q 10/04 701/31.4 |
| 2012/0133337 A1* | 5/2012 | Rombouts | H02J 3/32 320/155 |
| 2013/0116868 A1* | 5/2013 | Erko | B60W 10/26 701/22 |
| 2014/0214311 A1 | 7/2014 | Stevens et al. | |
| 2014/0232340 A1* | 8/2014 | Jones | H02J 7/0027 320/109 |

(Continued)

FOREIGN PATENT DOCUMENTS

DE  10 2012 015749  2/2013

OTHER PUBLICATIONS

International Search Report and Written Opinion for International Application No. PCT/US2015/043775, dated Oct. 16, 2015, 10 pages.

*Primary Examiner* — Brian Ngo
(74) *Attorney, Agent, or Firm* — Foley & Lardner LLP

(57) ABSTRACT

Disclosed are methods, systems, and computer-readable mediums for managing batteries of a fleet of vehicles. A computing device includes one or more processors configured to receive first battery data related to a first battery of a first vehicle, where the first vehicle is part of the fleet of vehicles, and compare the first battery data to fleet battery data related to one or more other batteries of vehicles in the fleet of vehicles. Based on the comparison a second vehicle in the fleet is determined in which to switch the first battery to improve battery life of the batteries of the fleet.

20 Claims, 3 Drawing Sheets

(56) References Cited

U.S. PATENT DOCUMENTS

2015/0039391 A1* 2/2015 Hershkovitz .......... G06Q 10/04
                                                   705/7.31
2015/0239365 A1* 8/2015 Hyde ................. B60L 11/1861
                                                   701/2

* cited by examiner

SYSTEMS AND METHODS FOR MANAGEMENT OF FLEET BATTERIES

BACKGROUND

The most common energy storage mechanism for vehicles is batteries, which offer energy storage capabilities and also supply necessary power to vehicles. However, battery technology faces major hurdles related to the costs and lifespans of the batteries. A duty cycle of such a battery generally relates to the loads the battery is expected to supply over a certain time period, and battery life is largely impacted by its corresponding duty cycle, among other factors. Often, difficulties in predicting a duty cycle of a battery lead to the oversizing of the battery in order to meet anticipated life requirements, which increases initial costs. Early battery failures are also a consequence of improper sizing, which increases warranty costs and decreases battery performance for a customer.

SUMMARY

Disclosed herein are methods, systems, and computer-readable mediums for the management of fleet batteries. One embodiment relates to a system, comprising a computing device comprising one or more processors. The one or more processors are configured to receive first battery data related to a first battery of a first vehicle, wherein the first vehicle is part of the fleet of vehicles, compare the first battery data to fleet battery data related to one or more other batteries of vehicles in the fleet of vehicles, and determine, based on the comparison, a second vehicle in the fleet in which to switch the first battery to improve battery life of the batteries of the fleet.

Another embodiment relates to a method of managing batteries of a fleet of vehicles. The method comprises receiving first battery data related to a first battery of a first vehicle, wherein the first vehicle is part of the fleet of vehicles. The method further comprises comparing, using a processing device, the first battery data to fleet battery data related to one or more other batteries of vehicles in the fleet of vehicles. The method further comprises determining, based on the comparison, a second vehicle in the fleet in which to switch the first battery to improve battery life of the batteries of the fleet.

Another embodiment relates to a system for managing batteries of a fleet of vehicles. The system comprises a device operably coupled to a vehicle of the fleet of vehicles. The device comprises a memory configured to store data, a transmitter, and one or more processors. The one or more processors are configured to record, in the memory, battery data related to a battery of the vehicle, wherein the battery data comprises usage data corresponding to duty cycle use of the battery by the vehicle and battery life parameters corresponding to the battery. The one or more processors are further configured to transmit, via the transmitter, the recorded battery data to a computing system configured to improve battery life of the batteries of the fleet.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Figure 1A:
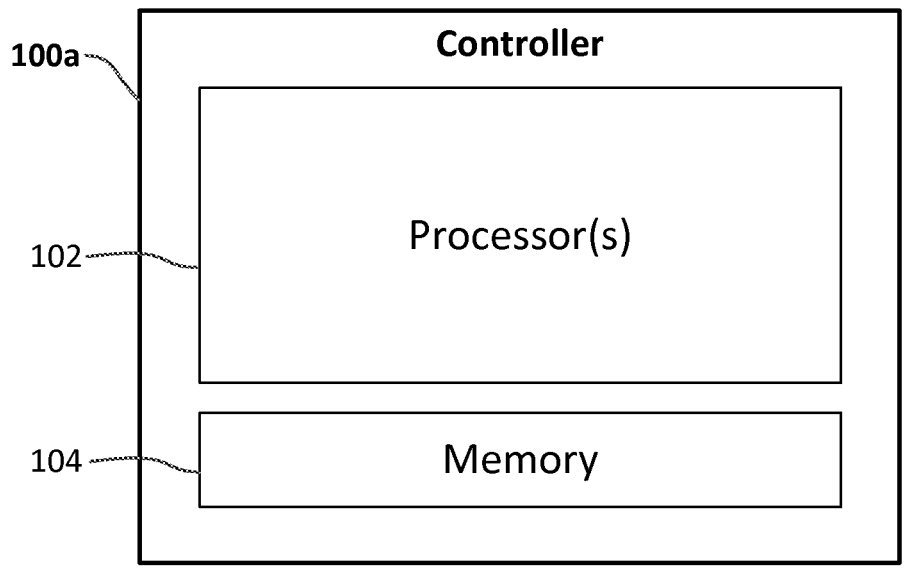
FIG. 1a shows a diagram depicting a controller for the management of fleet batteries, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are techniques for the management of fleet batteries. For example, such batteries may be the batteries corresponding to a fleet of vehicles of a company (e.g., hybrid electric vehicles, etc.). As another example, such batteries may be the batteries corresponding to a fleet of other machinery/equipment. In general, the disclosure herein provides a fleet level optimization methodology (as compared to a vehicle level) for battery life management. The techniques disclosed herein can reduce warranty costs related to the batteries, can level the battery performance across a customer's fleet and thereby increase fleet level performance of vehicles, and can ensure that the fleet batteries age in a consistent manner across the fleet. Battery life is highly dependent on a vehicle's duty cycle (i.e., the battery of the vehicle's duty cycle, which is directly affected by the vehicle's use), and because different vehicles operate over different duty cycles, the health of every battery can differ from the others in a fleet, as each battery generally has a unique duty cycle. The disclosed techniques take advantage of the occurrence that while a part of a fleet's batteries may be used more harshly, there are others in the fleet that are used less, or are even being under-utilized. By tracking various battery parameters and sharing batteries between the fleet's vehicles, it can be ensured that over a period of time, the batteries of the fleet are used more consistently, resulting in the improvement of the life of the batteries of the fleet as a whole.

Referring to FIG. 1a, a diagram of a controller 100a for managing fleet batteries is shown, according to one embodiment. Controller 100a is generally configured to operate as a centrally accessible server/device. For example, controller 100a may comprise a server at a station or business office of an operator of a fleet. Controller 100a can receive various data parameters via a communications interface (e.g., a Wi-Fi interface, a network interface, a COM port, a USB port, etc.) in order to track the use of the batteries. Such parameters may be analyzed by processor 102. For example, for each battery the parameters may include a battery throughput, RMS current values, a number of cycles, temperature measurements, charge levels, etc.). Processor 102 may be any commercially available CPU. Processor 102 may represent one or more processors and may be implemented as a general-purpose processor, an application specific integrated circuit (ASIC), one or more field programmable gate arrays (FPGAs), a digital-signal-processor (DSP), an engine control unit (ECU), a powertrain control module (PCM), a group of processing components, or other suitable electronic processing components. Any of the tracked and analyzed battery data may be stored in a memory 104, which may be local or remote storage. For example, memory 104 may include random access memory (RAM) devices comprising a main storage of the controller 100*a*, as well as any supplemental levels of memory, e.g., cache memories, non-volatile or back-up memories (e.g., programmable or flash memories), read-only memories, etc. In addition, memory 104 may include memory storage physically located elsewhere (e.g., remote storage) or elsewhere in controller 100*a*. For example, memory 104 may include any cache memory in the processor 102 as well as any storage capacity used as a virtual memory (e.g., as stored on a mass storage device, etc.).

In one embodiment, controller 100*a* receives parameters for a plurality of batteries of a fleet. Controller 100*a* may analyze such parameters over time to determine a battery life estimation for the batteries. In one embodiment, a state of health determination may be made based any number of parameters (e.g., battery throughput, RMS current, number of cycles, temperature, charge, etc.) that have a bearing on battery life. For example, one state of health algorithm may be based on an analyzing a battery impedance value, a battery capacity, a battery voltage, a battery self-discharge measure, an ability for the battery to accept a charge, and/or a number of complete charge—discharge cycles. In another embodiment, an algorithm may utilize a counter that represents battery health, where the counter is based on the cycling of a battery. An adjustable threshold may be used to define when a battery is considered to have completed a cycle, and when a battery has completed a cycle the counter may be incremented. In another embodiment, an algorithm may utilize a battery current integrator that monitors a battery's current over time to determine a battery life value. For example, higher current uses may contribute more to a battery life estimation than uses requiring a smaller current. The scope of the present disclosure is not limited to a certain measure of battery life, and any of the parameters discussed herein may be used, alone or in combination with other parameters, in order to determine a battery life or estimate a state of battery health.

Figure 1B:
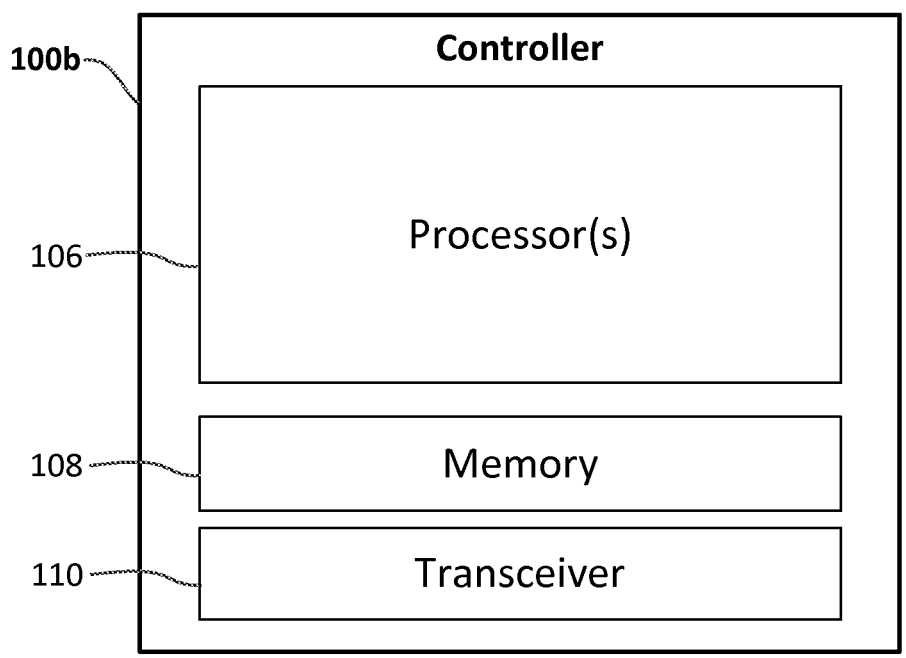
FIG. 1b shows a diagram depicting a controller for the management of fleet batteries, according to one embodiment.

Referring to FIG. 1*b*, a diagram of a controller 100*b* for managing fleet batteries is shown, according to one embodiment. Controller 100*b* may be part of a vehicle or other mobile device. Processor 106 may be any commercially available CPU. Processor 106 may represent one or more processors and may be implemented as a general-purpose processor, an application specific integrated circuit (ASIC), one or more field programmable gate arrays (FPGAs), a digital-signal-processor (DSP), an engine control unit (ECU), a powertrain control module (PCM), a group of processing components, or other suitable electronic processing components. Any of the tracked and analyzed data items may be stored in a memory 108, which may be local or remote storage. For example, memory 108 may include random access memory (RAM) devices comprising a main storage of the controller 100*b*, as well as any supplemental levels of memory, e.g., cache memories, non-volatile or back-up memories (e.g., programmable or flash memories), read-only memories, etc. In addition, memory 108 may include memory storage physically located elsewhere (e.g., remote storage) or elsewhere in controller 100*b*. For example, memory 108 may include any cache memory in the processor 106 as well as any storage capacity used as a virtual memory (e.g., as stored on a mass storage device, etc.). Transceiver 110 includes components (e.g., transmitters, receivers, etc.) necessary to transmit and receive data. For example, transceiver may include Wi-Fi components, wired networking components, radiofrequency communication components, etc. Controller 100*b* is generally configured to obtain the parameters related to battery use (e.g., battery throughput, RMS current, number of cycles, temperature, duty cycle usage information, etc.) for one or more vehicles and transmit them to another controller (e.g., controller 100*a*) for further processing.

Such information may be transmitted automatically based on a proximity of controller 100*b* to the other controller or based on a location (e.g., when a vehicle enters an organization's garage or gets within a certain distance from a control center, etc.). In one embodiment, controller 100*b* is part of a mobile processing device that can be temporarily or permanently coupled to a vehicle to retrieve such parameters. Controller 100*b* may be further equipped with location tracking information (e.g., a GPS device) and may correlate the battery usage data with location coordinates based on the route of the vehicle. As an example, controller 100*b* may interface with the on-board diagnostics (OBD) of a vehicle to obtain the battery-related parameters. As another example, controller 100*b* may utilize transceiver 110 to communicate wirelessly with the control systems of a vehicle in order to acquire battery related parameters. As another example, controller 100*b* may be configured to remain in a vehicle and record battery/route related parameters. For example, controller 100*b* may interface the ECU and other components of the vehicle (e.g., via the CAN bus of the vehicle, etc.). After obtaining such parameters, controller 100*b* may transmit the parameters to other systems (via transceiver 110) for further analysis. In some embodiments, controller 102*b* may be configured similarly to controller 100*a*, and may further determine when and where a battery of a fleet should be swapped. For example, controller 100*b* may be part of a mobile device having a display screen, and such a display may be used to present battery information and swap related instructions to an operator.

Figure 2:
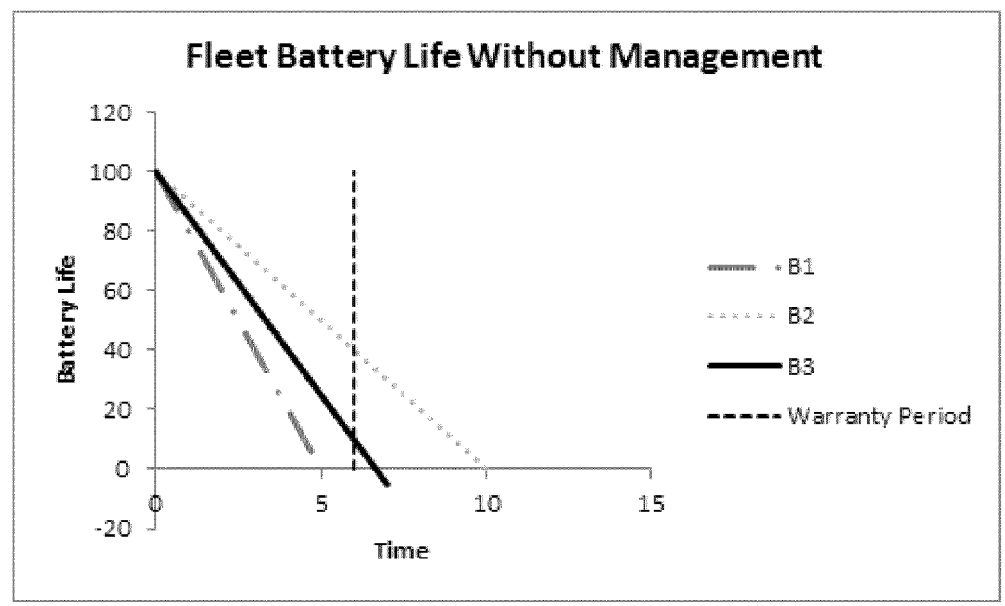
FIG. 2 depicts charts related to the management of fleet batteries, according to one embodiment.
Figure 2:
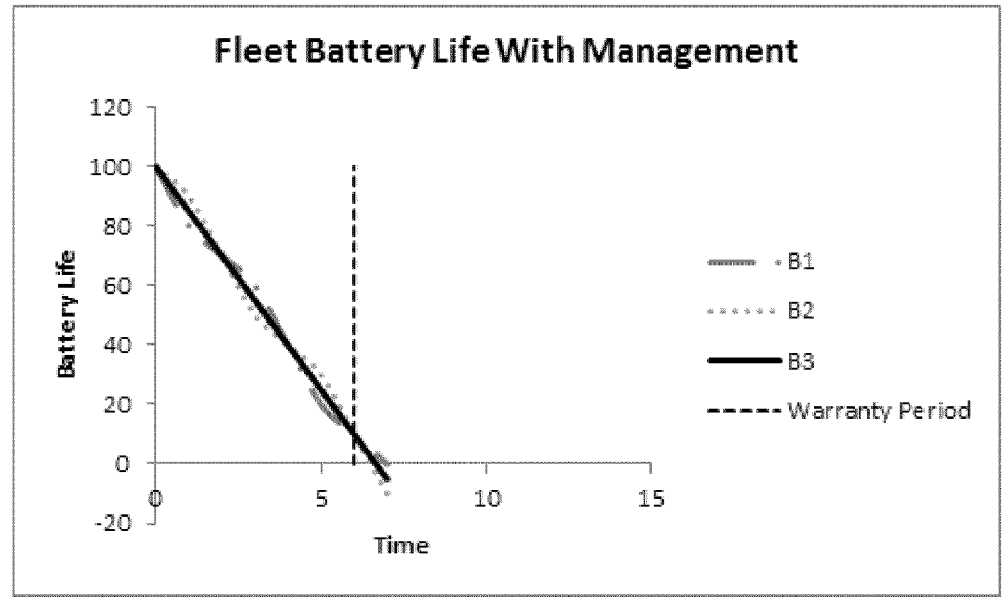

Consider an example of a fleet with hybrid vehicles V1, V2, and V3, having batteries B1, B2, and B3, respectively. Referring to FIG. 2, graphical representations 200*a* and 200*b* of the foregoing example are shown. In this example, a battery life of 100% may be viewed as full battery life, and a battery life of 0% may represent a battery at the end of its life. Batteries B1, B2, and B3 may each have a battery life of 100 at the beginning of use. At the end of time T1, the life of B1 may be at 80%, B2 may be at 90%, and B3 may be at 85%. If all three vehicles and batteries continued to operate in a similar manner, after a time of **T2=2*T1, the life of B1 would be at 60%, B2 at 80%, and B3 is 70%. If this progression continues, battery B1** will reach end of its life after a period of 5*T1, B2 after a period of 10*T1, and B3 after a period of 6.6*T1. If the warranty period for each the batteries is 6*T1, battery B1 will incur a warranty cost for the battery producer to replace the battery, as it will have reached the end of its life prior to the expiration of the warranty period. In addition, the performance of the batteries was not level over their course of operation, which may have resulted in inconsistencies for the customer. The graphical representation 200a depicts the results of typical battery use without using the techniques disclosed herein.

However, by employing the disclosed battery management techniques at fleet level in order to swap batteries between vehicles V1, V2, and V3, the duty cycles of battery use from V1, V2, and V3 could effectively be distributed (i.e., a "shared" duty cycle may be created) between the batteries. For example, if B2 and B1 were swapped at the end of T1, after T2=2*T1, the life of B1 will be 70%, B2 will be at 70%, and B3 will be at 70%. By continually monitoring the battery use parameters to determine when to swap batteries, the life of all fleet batteries can be balanced (and duty cycles "shared") such that the battery lives degrade at leveled rates between the fleet batteries as a whole. By using such swapping techniques, batteries B1, B2, and B3 will each reach their end of life after a period of approximately 7*T1. The graphical representation 200b depicts the results of such a methodology. In this manner, the life of the three batteries (B1, B2, and B3) will exceed their warranty period, thereby saving warranty costs to the manufacturer and also prolonging the life of the batteries in general for the customer (as the rate of battery life degradation has been reduced with respect to the fleet of batteries as a whole). Further, the performance of the batteries is leveled across the fleet, resulting in more consistent battery performance for the customer. Precise determinations of when to swap batteries may be based on the particular specifications of batteries in use, the nature of the battery use, the number of vehicles in the fleet, warranty information, battery performance considerations of an operator, and other operational considerations as needed by an operator/organization.

Referring again to FIG. 1a, controller 100a may receive the parameters necessary to determine when to swap a battery through various means. The scope of the present disclosure is not limited to a particular method of supplying data to controller 100a. In one embodiment, controller 100a may comprise a vehicle scheduling system for a fleet of vehicles, and can receive transmitted battery data from another portable controller (e.g., controller 100b). Such a scheduling system may be locally based (e.g., at a central location for an organization's fleet) or may be a web/internet based system that is locally and remotely accessible. In one embodiment, controller 100a receives the battery data from a battery monitoring module that may be integrated or otherwise coupled to a vehicle. For example, controller 100b may be part of a vehicle's control systems. As another example, controller 100b may be an add-on unit to a vehicle. After battery parameters are received, controller 100a may perform analysis to compute a particular battery's battery life, which is based on duty cycle use of the battery. In some embodiments, controller 100a has access to future scheduled use of a battery, which may be based on type work to be performed with the battery, a route to be driven, an estimated time that they battery will be active, an amount of power required for a certain task, etc. In this manner, controller 100a may further adjust a battery life estimate or determine when to swap a battery based on knowledge of upcoming battery use. In alternative embodiments, rather than recommending a battery swap, controller 100a may recommend that an operator be assigned to a different vehicle (or other fleet machinery, etc.), or controller 100a may automatically adjust an operator assignment. In this manner, duty cycles of fleet batteries may be effectively "shared" by distributing operators to different vehicles in order to even out duty cycle use of the batteries.

Figure 3:
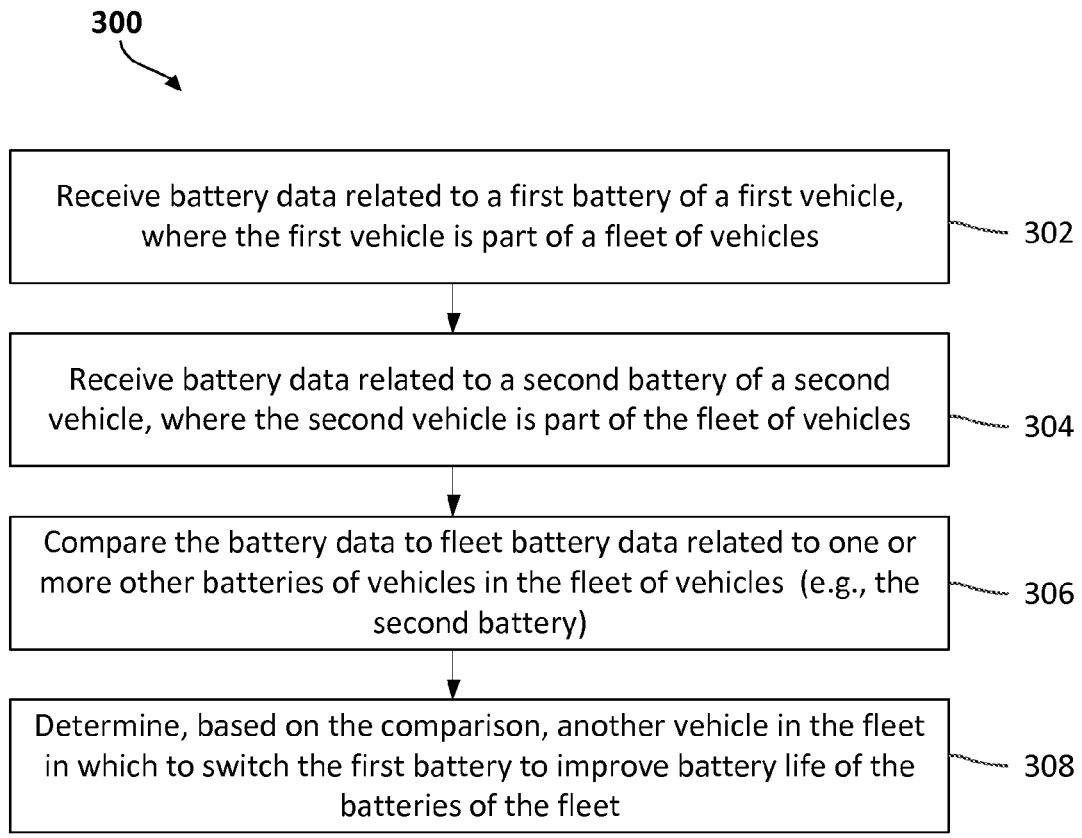
FIG. 3 is a flow diagram of a process for managing fleet batteries, according to one embodiment.

Referring to FIG. 3, a flow diagram of a process 300 for managing fleet batteries is shown, according to an embodiment. In alternative embodiments, fewer, additional, and/or different steps may be performed. Also, the use of a flow diagram is not meant to be limiting with respect to the order of steps performed. Process 300 includes receiving battery data related to a first battery of a first vehicle, where the first vehicle is part of a fleet of vehicles (302). Battery data related to a second battery of a second vehicle can also be received, where the second vehicle is also part of the fleet of vehicles (304). The battery data may comprise any of the battery-use related data as discussed herein, and it may be provided directly from a vehicle, or via an intermediate device that is used to collect such data. For each battery, battery data may be trended and analyzed. The battery data is compared to fleet battery data related to one or more other batteries of vehicles in the fleet of vehicles (306). For example, the data related to the first battery may be compared to the battery data related to the second battery. Based on the comparison, another vehicle in the fleet is determined in which to switch the first battery (308). In general, the first battery has a first duty cycle and the second battery has a second duty cycle. By swapping batteries between fleet vehicles, a shared duty cycle may be leveled between fleet batteries, which improves battery life as a whole.

In any of the embodiments discussed herein, the controllers (e.g., controller 100a and 100b) may form a portion of a processing subsystem including one or more computing devices having memory, processing, and communication hardware. The controllers may be a single device or a distributed device, and the functions of the controllers may be performed by hardware and/or as computer instructions on a non-transient computer readable storage medium, and functions may be distributed across various hardware or computer based components. In certain embodiments, a controller can be part of the control system of a vehicle (e.g., controller 100b may be part of or form an engine control unit (ECU) or other CAN bus microcontroller of a vehicle). In other embodiments, the controller is separate from the vehicle. For example, controllers 100a and 100b may be separate devices that are configured to interface with various systems of a vehicle in order to implement the techniques disclosed herein.

In general, the routines executed to implement the embodiments may be implemented as part of an operating system or a specific application, module, or sequence of instructions. In certain embodiments, the controllers include one or more modules structured to functionally execute the operations of the controllers to monitor battery use parameters (e.g., related to duty cycle use) and to manage a fleet of batteries (e.g., by determining battery swaps to be made in order to increase the fleet battery life as a whole). The description herein including modules emphasizes the structural independence of the aspects of the controllers and illustrates one grouping of operations and responsibilities of the controllers. More specific descriptions of certain embodiments of the controllers' operations are described by the sections herein referencing FIGS. 1-3. Other groupings that execute similar overall operations are understood within the scope of the present application. The modules typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks, flash memory, among others.

Example and non-limiting module implementation elements include the sensors, systems, and/or connections required to allow the controllers to communicate with systems of a vehicle, to communicate with each other, and to manage fleet batteries as discussed herein. Any such implementation elements each may be communicably coupled to the controllers and provide any value determined herein. Examples and non-limiting module implementation elements may further include devices for providing any value that is a precursor to a value determined herein, data links and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any valve actuator including at least an electrical, hydraulic, or pneumatic actuator, a solenoid, an op-amp, analog control elements (springs, filters, integrators, adders, dividers, gain elements), and/or digital control elements.

It should be understood that the embodiments and examples described herein in no way limit the present disclosure to methods, systems, and computer-readable mediums for the management of batteries for a fleet of vehicles. The methods, systems, and computer-readable mediums described herein may be used to manage a fleet of batteries for many other purposes, for example, solar energy storage, battery-operated tools, appliances, medical devices, satellites, toys, and emergency equipment, among other applications.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A system for managing batteries of a fleet of vehicles, comprising:
    a computing device comprising one or more processors configured to:
        receive first battery data related to a first battery of a first vehicle, wherein the first vehicle is part of the fleet of vehicles;
        compare the first battery data to fleet battery data related to one or more other batteries of vehicles in the fleet of vehicles; and
        determine, based on the comparison, a second battery of a second vehicle in the fleet in which to switch the first battery to improve battery life of the batteries of the fleet; and
        cause an indication of the second vehicle to be displayed on a display of the computing device;
    wherein the first battery has a first duty cycle and the second battery has a second duty cycle, and wherein improving battery life of the batteries of the fleet comprises leveling a shared duty cycle between the first battery and the second battery, wherein the shared duty cycle is based on the first duty cycle and the second duty cycle.

2. The system of claim 1, wherein improving battery life of the batteries of the fleet further comprises balancing battery health of the batteries based on a warranty period corresponding to one or more of the batteries.

3. The system of claim 1, wherein improving battery life of the batteries of the fleet comprises causing a battery life of the first battery to exceed a warranty period of the first battery.

4. The system of claim 1, wherein the first battery data comprises:
    usage data corresponding to duty cycle use of the first battery by the first vehicle; and
    battery life parameters related to the first battery.

5. The system of claim 4, wherein the battery life parameters comprise at least one of battery throughput of the first battery, an RMS current of the first battery, a number of cycles of the first battery, and temperature of the first battery.

6. The system of claim 1, wherein the one or more processors are further configured to analyze fleet route data related to one or more upcoming routes of the vehicles in the fleet of vehicles, and wherein determining the second vehicle in the fleet in which to switch the first battery is further based on the route data analysis.

7. The system of claim 1, wherein switching the first battery into the second vehicle comprises swapping the first battery with the second battery of the second vehicle such that the second battery is switched into the first vehicle.

8. The system of claim 1, wherein the first battery data is received wirelessly from a computer system of the first vehicle.

9. The system of claim 8, wherein the first battery data is received automatically based on a proximity of the first vehicle to a location of the computing device.

10. The system of claim 1, wherein the first battery data is received via an intermediate device configured to collect the fleet battery data.

11. A method of managing a plurality of batteries, comprising:
receiving first battery data related to a first battery, wherein the first battery is part of the plurality of batteries;
comparing, using a processing device, the first battery data to data related to one or more other batteries of the plurality of batteries;
determining, based on the comparison, a duty cycle for the first battery to improve battery life of the plurality of batteries; and
causing the first battery operate according to the determined duty cycle;
wherein the first battery has a first duty cycle and a second battery has a second duty cycle, and wherein improving battery life of the plurality of batteries comprises leveling a shared duty cycle between the first battery and the second battery, wherein the shared duty cycle is based on the first duty cycle and the second duty cycle.

12. The method of claim 11, wherein improving battery life of the plurality of batteries further comprises balancing battery health of the batteries based on a warranty period corresponding to one or more of the batteries.

13. The method of claim 11, wherein the first battery data comprises:
usage data corresponding to duty cycle use of the first battery; and
battery life parameters related to the first battery.

14. The method of claim 13, wherein the battery life parameters comprise at least one of battery throughput of the first battery, an RMS current of the first battery, a number of cycles of the first battery, and temperature of the first battery.

15. A system for managing batteries of a fleet of vehicles, comprising:
a device operably coupled to a vehicle of the fleet of vehicles, wherein the device comprises:
a memory configured to store data;
a transmitter; and
one or more processors configured to:
record, in the memory, battery data related to a battery of the vehicle, wherein the battery data comprises usage data corresponding to duty cycle use of the battery by the vehicle and battery life parameters corresponding to the battery; and
transmit, via the transmitter, the recorded battery data to a computing system configured to improve battery life of the batteries of the fleet;
wherein the battery has a duty cycle, and wherein improving battery life of the batteries of the fleet comprises leveling a shared duty cycle between the battery and a second battery of the fleet.

16. The system of claim 15, wherein improving battery life of the batteries of the fleet further comprises balancing battery health of the batteries based on a warranty period corresponding to one or more of the batteries.

17. The device of claim 15, wherein the battery life parameters comprise at least one of battery throughput of the first battery, an RMS current of the first battery, a number of cycles of the first battery, and temperature of the first battery.

18. The device of claim 15, wherein the transmitter comprises a wireless transmitter, and wherein the recorded battery data is transmitted wirelessly to the computing system.

19. The device of claim 18, wherein the recorded battery data is transmitted automatically based on a proximity of the vehicle to a location of the computing system.

20. The device of claim 15, wherein the one or more processors are further configured to:
record, in the memory, route data related to one or more routes of the vehicles; and
transmit, via the transmitter, the recorded route data to the computing system configured to improve battery life of the batteries of the fleet of vehicles.

* * * * *